Figure 1:
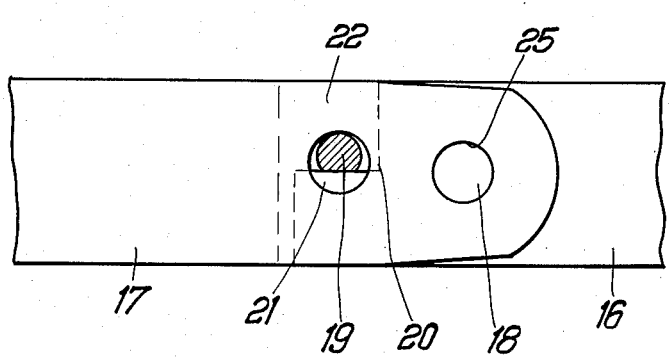

July 4, 1961     A. VANWERSCH ET AL     2,991,101

CONNECTING STRUCTURE FOR BEAMS OF A ROOF SUPPORT OR THE LIKE

Original Filed May 23, 1955

Inventors:
Aloys Vanwersch
Peter Vanwersch
Ludwig Vanwersch
BY Michael S. Striker
Attorney United States Patent Office 2,991,101
Patented July 4, 1961

2,991,101
CONNECTING STRUCTURE FOR BEAMS OF A ROOF SUPPORT OR THE LIKE
Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204. Divided and this application Dec. 24, 1958, Ser. No. 782,855
In France July 8, 1948
Public Law 619, Aug. 23, 1954
Patent expires July 8, 1968
1 Claim. (Cl. 287—99)

This application is a divisional application of our copending application Serial No. 510,204, filed May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with an opening and a notch aligned with the openings of the spaced walls. A pivot pin extends through the set of aligned openings so that the first and second beams are turnable with respect to each other to a desired angular position, and one or more elongated wedge members extend through the other set of openings aligned with a notch in the second beam for locking the beams in a given angular position as well as for turning the beams to the desired angular position.

Figure 2:
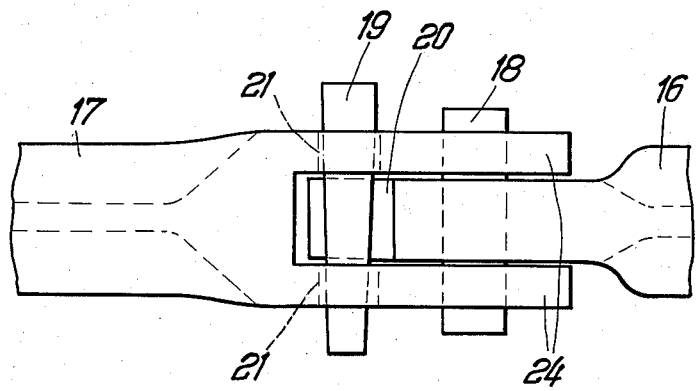

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side elevational view illustrating one possible manner of interconnecting a pair of beams; and FIG. 2 is a top plan view of the structure of FIG. 1.

Referring now to the drawing, it will be seen that the beam 17 of FIGS. 1 and 2 has a bifurcated end portion provided with a pair of spaced walls 24 between which the end portion of the beam 16 freely extends. The beams 16 and 17 are supported in a known way by suitable props not shown in the drawing and serving to hold the beams against the roof of a mine shaft or the like. The walls of the end portion of beam 17 and the end portion of beam 16 are respectively formed with openings 25 which are aligned and through which a pivot pin 18 extends so that in this way the beams 16 and 17 are pivotally connected for angular movement with respect to each other. Through such angular movement of the beams it is possible to arrange them so that they correspond to the contour of a particular roof to be supported. The walls of the bifurcated end portion of beam 17 are furthermore formed with a pair of aligned openings 21 respectively, through which an elongated wedge member 19 extends. Beam 16 is formed with a notch 22 at the end thereof having a plane surface 20 extending axially of the beam 16. Wedge member 19 engages the axial surface 20 of notch 22. In the adjusted angular position the wedge member 19 is moved along its axis so as to abut against the axial surface 20 of beam 16 in order to maintain the beams in the desired angular position, and to prevent downward turning of beam 16 with respect to beam 17.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In a supporting structure, in combination, a first beam having a bifurcated end portion provided with a pair of spaced walls each of which is formed with a pair of openings, the openings of one of said walls being aligned with those of the other of said walls; a second beam having an end portion extending between said walls of said bifurcated end portion of said first beam, said second beam terminating in a stepped end face aligned with one pair of aligned openings of said walls and said second beam being formed with an opening aligned with the other pair of aligned openings of said walls to provide three aligned openings; a pivot pin extending through said three aligned openings for turnably interconnecting said first and second beams; and an elongated wedge member extending through said one pair of aligned openings and engaging said stepped end face of said second beam.

References Cited in the file of this patent

UNITED STATES PATENTS

| | | |
|---|---|---|
| 553,650 | Kingsland | Jan. 28, 1896 |

FOREIGN PATENTS

| | | |
|---|---|---|
| 1,009,905 | France | Mar. 12, 1952 |
| 1,135,845 | France | Dec. 22, 1956 |